United States Patent [19]
Liebermann et al.

[11] Patent Number: 5,136,885
[45] Date of Patent: Aug. 11, 1992

[54] QUARTZ CRYSTAL PRESSURE SENSOR

[75] Inventors: Leonard N. Liebermann, La Jolla; Phillip Salzmann, Laucadia, both of Calif.

[73] Assignee: TIF Instruments, Inc., Miami, Fla.

[21] Appl. No.: 680,769

[22] Filed: Apr. 5, 1991

[51] Int. Cl.⁵ ............................................. G01L 11/00
[52] U.S. Cl. ...................................... 73/702; 310/338
[58] Field of Search ..................... 73/702, 35; 310/338, 310/370

[56] References Cited

U.S. PATENT DOCUMENTS 4,644,796  2/1987  Ward ..................................... 73/702
4,995,265  2/1991  Stocker ................................ 73/702

*Primary Examiner*—Donald O. Woodiel
*Attorney, Agent, or Firm*—David B. Harrison

[57] ABSTRACT

A quartz crystal gas pressure sensor senses a range of pressures within a gaseous environment, such as from 0.1 millibar to 1 bar. The sensor includes a quartz crystal connected to manifest a piezoelectric effect upon excitation by an alternating electric field and communicating with the gaseous environment, an oscillator circuit connected to the quartz crystal for generating the alternating electric field and including a feedback circuit for providing a signal for self-excitation at the resonant frequency of the crystal as well as indication of vibrational amplitude of the crystal as a function of gas pressure within the gaseous environment, and an indicator circuit connected to the feedback circuit for converting the electrical signal into an indication of the gas pressure sensed within the gaseous environment. A gas pressure measuring method is also described.

14 Claims, 5 Drawing Sheets

QUARTZ CRYSTAL PRESSURE SENSOR

FIELD OF THE PRESENT INVENTION

The present invention relates to gas pressure sensors. More particularly, the present invention relates to an electronically excited oscillating quartz crystal gas pressure sensor element, particularly useful for sensing vacuum or negative pressures.

BACKGROUND OF THE INVENTION

One conventional method for measuring vacuum or negative pressures in a range of from 0.1 millibar to 1 bar (ambient atmospheric pressure) is by thermal conductivity. The temperature of an electrically heated wire depends upon heat loss to the surrounding gas. As gas pressure is reduced and its thermal conductivity decreases, the temperature of the heated wire increases. Usually, the heated wire is connected as one part of a Wheatstone bridge, so that electrical change in resistance associated with heating of the wire is related to the vacuum to be measured. Alternatively, the heated wire is replaced by a thermistor which is similarly electrically heated, but which displays much larger resistance changes in vacuum.

The thermal conductivity gauge is commonly known as a Pirani gauge. The thermal conductivity method presents two problems: First, the heated sensor consumes power, requiring heavy batteries or a connection to the AC mains power supply. Second, the sensor requires a warmup time for reaching thermal equilibrium before measurements may commence. In addition, this method usually requires operator intervention and adjustment in order to balance the bridge initially upon powering up.

It is known that the presence of air or other gases surrounding a mechanical vibrator exerts a damping effect upon the vibration. As the pressure of the surrounding gas is diminished, the damping effect is reduced. A vacuum gauge known to those familiar with vacuum techniques as the Langmuir gauge (see, Beckman, J.O.S.A., 16, 276 (1928)) utilizes this effect. A fine quartz fiber is anchored at one end and the other end is free to vibrate. Vibration is excited by striking the fiber (internally) and the time for the free vibrations to decay to half amplitude is monitored. Essentially, the decay time is as an indicator of vacuum. As the gas pressure is reduced, the decay time of the vibrator increases.

Miniature quartz tuning forks intended for timing control for wristwatches have been suggested as vibrators for this purpose. Measurements of the effect of changes in gas pressure on the Q (or alternatively on the reciprocal of Q) of these commercial devices are disclosed in a paper by Christen entitled "Air and Gas Damping of Quartz Tuning Forks", *Sensors and Actuators* 4, pp. 555-564, (1983). Christen's disclosure is a report of laboratory measurements, and he offers no means for measuring the Q which would suggest a device or sensor which could be reduced to a practical, portable instrument for vacuum measurement.

Measurement of Q in an electrically oscillating circuit is well known. Generally, there are two alternative methods for measuring Q. The first method is to measure the time for the oscillations to decay (e.g. to one half amplitude) after the driving oscillator has stopped. This is the method of the Langmuir gauge. A second method is a measurement of the bandwidth of the vibrator by driving it with a variable frequency oscillator and tuning over the frequency band of the vibrator. Neither of these two methods lends itself to a simple direct measurement suitable for a commercial gas pressure gauge.

SUMMARY OF THE INVENTION WITH OBJECTS

A general object of the present invention is to provide a gas pressure gauge which overcomes limitations and drawbacks of prior approaches to the measurement and indication of gas pressure conditions, particularly vacuums and negative pressures.

A more specific object of the present invention is to provide a gas pressure measurement system using a quartz vibrator and an electronic circuit whereby the amplitude of an electrical oscillating signal is an indicator of gas pressure.

One more specific object of the present invention is to provide a quartz crystal vacuum gauge in which the amplitude of the oscillating electrical signal is proportional to the (negative) logarithm of the gas pressure.

Yet another more specific object of the present invention is to provide a quartz crystal gas pressure gauge including a circuit for continuously exciting the quartz crystal at its resonant frequency over a wide range of vacuum pressures, e.g from 0.1 millibar to 1 bar (atmospheric pressure).

Still one more specific object of the present invention is to provide a gas pressure sensor and measuring instrument which is relatively inexpensive and in addition requires no warmup and no operator adjustment upon initial application of operating power.

Still a further specific object of the present invention is to provide a small, self contained, low power gas pressure gauge which is accurate, rugged and reliable over an extended service life.

One more specific object of the present invention is to provide a quartz crystal gas pressure sensor assembly constructed of readily available, low cost components, and which may be readily removed and exchanged without special skills or tools.

In accordance with principles of the present invention, a quartz crystal gas pressure sensor is provided for sensing a range of gas pressures within a gaseous environment. The sensor includes a quartz crystal connected to manifest a piezoelectric effect upon excitation by an alternating electric field and communicating with the gaseous environment, an oscillator circuit connected to the quartz crystal for generating the alternating electric field and including a feedback circuit for providing a signal for self-excitation at the resonant frequency of the crystal as well as indication of vibrational amplitude of the crystal as a function of gas pressure within the gaseous environment, and an indicator circuit connected to the feedback circuit for converting the electrical signal into an indication of the vacuum pressure sensed within the gaseous environment.

In one aspect of the present invention the oscillator feedback circuit generates the electrical signal which is related to the vibrational amplitude of the quartz crystal at the sensed gas pressure; and, the indicator circuit provides the indication of the gas pressure as a (negative) logarithm proportional to the amplitude of the crystal signal over the particular gas pressure range which may extend from 0.1 millibar to 1 bar, for example.

In another aspect of the present invention, the oscillator circuit includes oscillation enhancing circuit elements for starting continuous piezoelectric response of the quartz crystal at external ambient gas pressure as high as 1 bar, or greater. For example, the oscillation enhancing circuit elements may comprise resistance and capacitance elements connected to the quartz crystal.

In still one more aspect of the present invention, the indicator circuit includes a second transimpedance amplifier means having a high impedance input connection from the feedback circuit for receiving the electrical signal and having a low impedance output. In this aspect, the indicator circuit also comprises a rectifier connected to the oscillating output of the second transimpedance amplifier for converting the electrical signal into a DC voltage. In this aspect, the (negative) logarithm of the vacuum pressure is approximately a linear function of the magnitude of the DC voltage.

In one further aspect of the present invention, the quartz crystal comprises a miniature time base crystal which was originally contained in a hermetically sealed and evacuated housing and which has been modified by provision of a small opening in the housing for communicating with the gaseous environment. In this aspect the miniature time base crystal and housing are preferably contained within a fixture communicating directly with the gaseous environment, and including structural elements for protecting the time base crystal against intrusion by contaminants from the gaseous environment. Also, the fixture may advantageously be threaded so as to enable it to be mounted onto a fitting directly communicating with the gaseous environment.

A method for sensing gas pressure in a gaseous environment in accordance with the principles of the present invention comprises the steps of:

- causing a quartz crystal in direct physical communication with the gaseous environment, to oscillate continuously at resonance in response to an exciting electric field and generate a signal as an indication of the amplitude of oscillation of the crystal,
- sensing magnitude of the crystal signal and converting its magnitude into a DC voltage, and
- displaying the DC voltage as a measurement of the gas pressure.

In this method the gas pressure within the gaseous environment extends over a predetermined range, such as 0.1 millibar to 1 bar, or greater, for example.

Also, as an aspect of this method the magnitude of the crystal signal is a function which is approximately linear as the (negative) logarithm of the pressure.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF A PREFERRED EMBODIMENT

Figure 1:
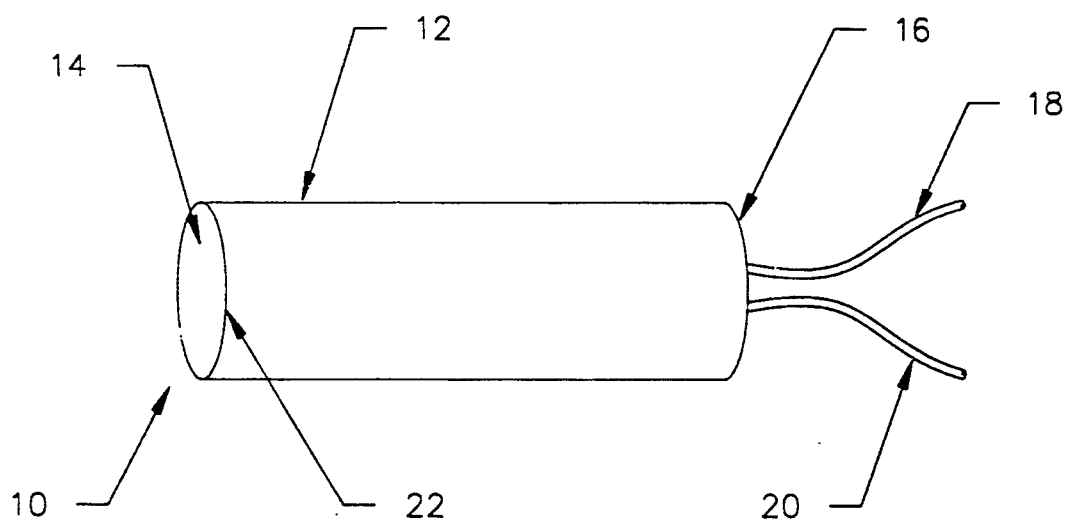
FIG. 1 is a greatly enlarged, somewhat diagrammatic side view in elevation of a miniature tubular-encapsulated quartz crystal which is modified to form a gas pressure sensing element in accordance with principles of the present invention.

With reference to FIG. 1, a quartz watch timing crystal assembly 10 is shown. This assembly typically comprises a small evacuated cylindrical tube 12 with enclosed end wall portions 14 and 16. Electrical connection leads 18, 20 typically extend from the end wall portion 16 to enable a crystal element (not shown) within the tube 12 to be excited electrically and vibrate at its natural resonant frequency. The frequency of operation of these small wristwatch timing crystals is typically 32.768 KHz, although other frequencies may be used. The length of the cylinder 12 is approximately 0.3 inches, and its diameter is 0.1 inches. The interior of the hollow cylindrical tube 12 is typically highly evacuated during manufacture.

In accordance with an aspect of the present invention, the crystal assembly 10 is modified by provision of a tiny hole 22 by the following process. First, a small groove at the edge at the site of the hole is formed by filing, grinding, or other suitable technique. This groove is to thin the metal of the case 12, but it does not extend entirely through the case. Second, the assembly 10 is then cleaned by air blast, or other technique to remove any filings or residual loose particles, so that they cannot enter and contaminate the interior space within the case 12 housing the crystal resonator element. Third, a sharply pointed instrument is forced into the case 12 at the groove to punch the small hole 22 without adding contaminants or loose metal particles to the interior of the case 12.

Figure 2:
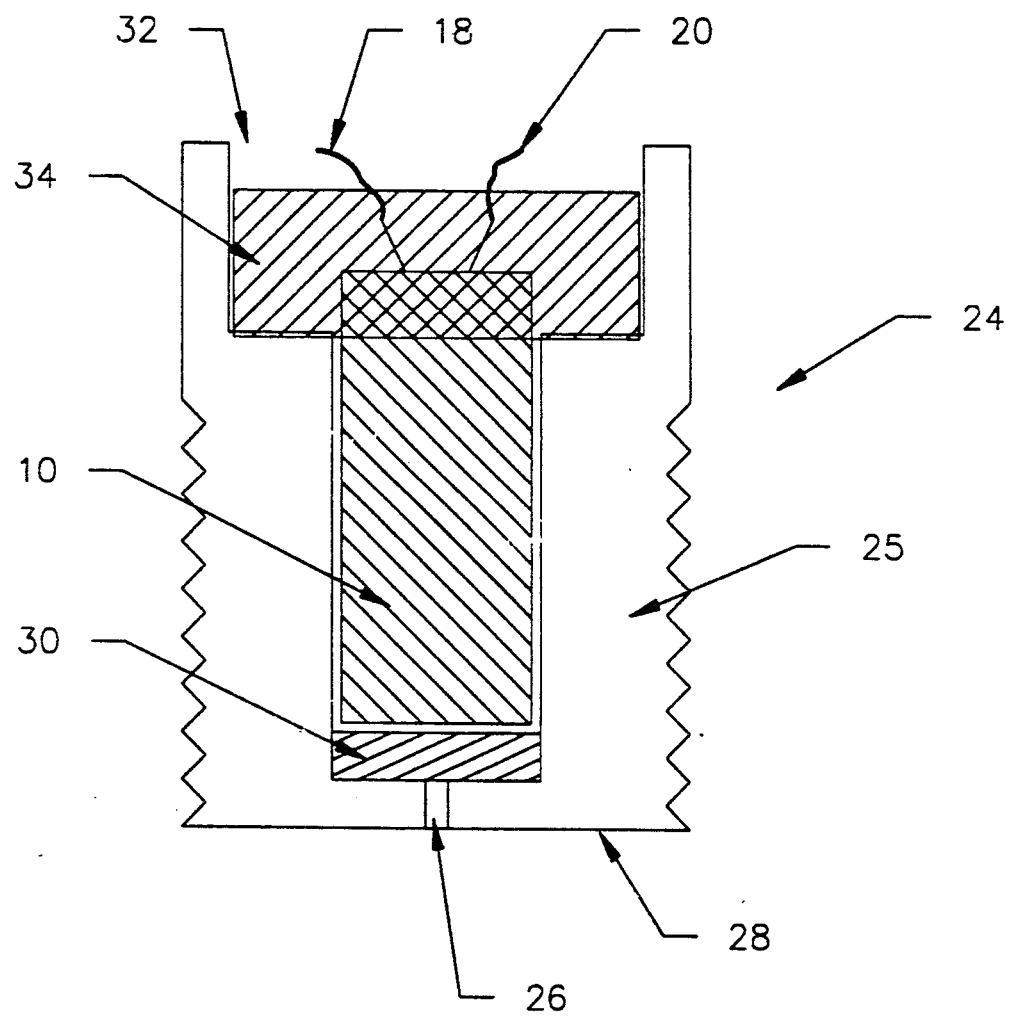
FIG. 2 is an enlarged view in side elevation and section of a quart crystal gas pressure sensor assembly including the FIG. 1 crystal in accordance with principles and aspects of the present invention.

Turning now to FIG. 2, a sensor assembly 24 is shown which includes the modified crystal assembly 10 having the hole 22. After the hole 22 is formed, the modified crystal assembly 10 is inserted into e.g. a hollow threaded fitting 25 such as a ⅛ inch standard pipe plug. A small orifice 26 is defined through an end wall 28 of the fitting 25 to admit ambient pressure to an interior space within the fitting 25, now occupied by the crystal assembly 10. A filter media element 30, such as cotton, plaster, etc., prevents oil or other liquid or gas borne particulate contaminants from reaching the crystal 10 and its interior space. (An external oil trap may be provided for further protection against contamination from pump oil). An open end 32 of the plug 25 is then filled with an encapsulating material 34, such as curable epoxy resin to seal the crystal assembly 10 within the interior space of the completed sensor assembly 24, thereby leaving the orifice 16 as the only gas entry/exit passage reaching the crystal 10. Of course, the connection leads 18 and 20 extend through the epoxy plug 25 to enable connections to be made to an external circuit 50.

The use of a threaded plug 25 permits easy replacement of the entire sensor assembly 24. Replacement may be necessary in the event that contaminating liquids, e.g. oil, are accidentally introduced into the quartz sensor housing. The quartz vibrator 10 is exceedingly sensitive to deposition of any material onto its surfaces.

Quartz crystal oscillator circuits are well known. These circuits are self-excited oscillators wherein the electrical oscillating frequency is controlled by the mechanical vibration of the piezoelectric crystal. These circuits are usually intended for applications requiring precise frequency control, such as timing or transmitting applications, etc., wherein the oscillating frequency is required to be exceedingly stable and rigidly controlled. In these circuits the amplitude of oscillation of the crystal is constant and relatively strong. However, in order for the quartz crystal to be used as a gas pressure indicator, its amplitude of oscillation is not constant, but rather varies generally inversely in relation to the pressure of the gas immediately surrounding the crystal.

Figure 3:
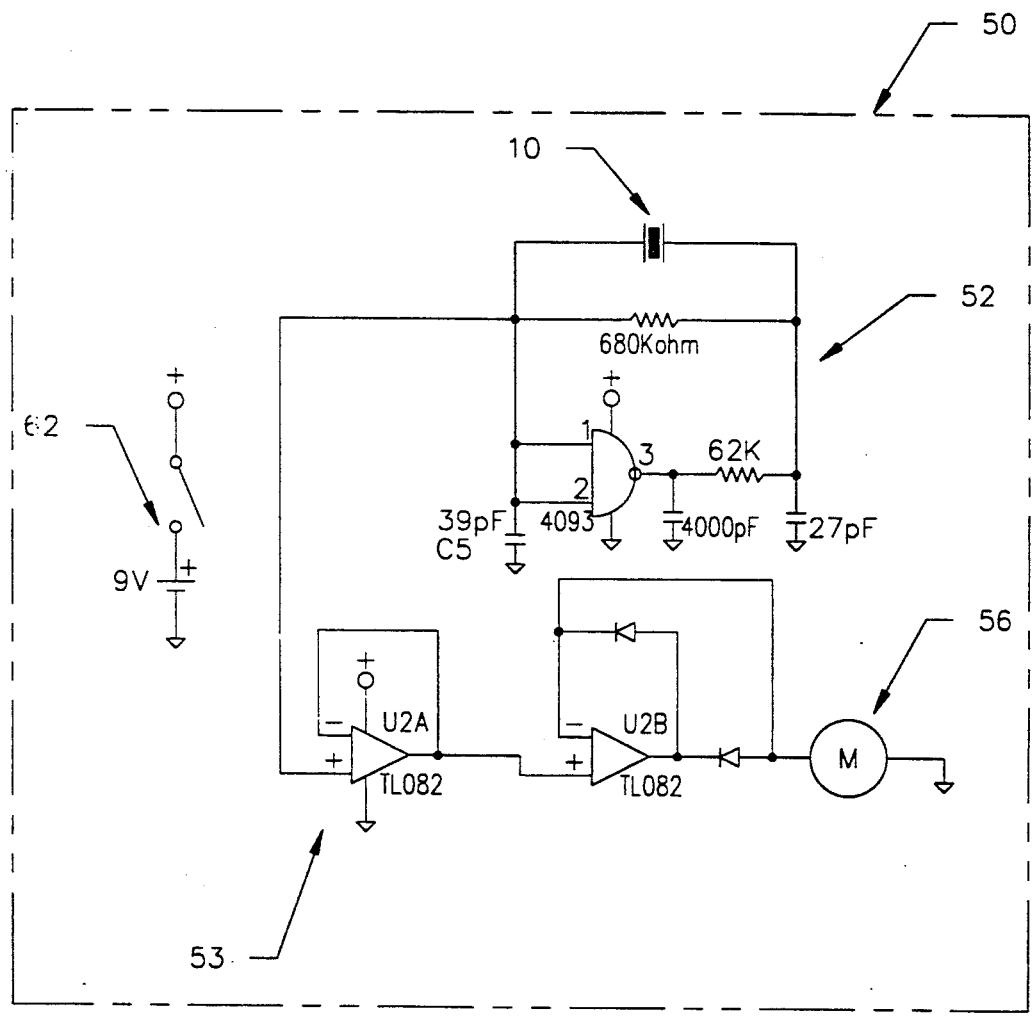
FIG. 3 is an electrical schematic circuit diagram of a quartz crystal gas pressure sensor instrument in accordance with principles of the present invention.

Turning now to FIG. 3, a circuit 50 is disclosed for providing a measure of the amplitude of the excited oscillations in the quartz crystal 10 in function of the damping applied thereto by the surrounding gas. Most importantly, with the circuit 50, the amplitude of the oscillating electrical signal, when measured at a specified node, varies with the pressure of the surrounding gas. Clearly, in this circuit 50 there must be a proportionality relationship between the mechanical amplitude of oscillation of the crystal and the electrical oscillation at the specified measuring node.

Inasmuch as the vibration of the crystal 10 is affected by the ambient gas pressure reaching it, e.g. via the orifice 26 and small hole 22, it is important that crystal oscillation can be initiated even under high damping conditions, as when the completed sensor assembly 24 is exposed to ambient atmospheric air pressure. Only certain values of the components (e.g. the specified values) will assure oscillation initiation in the circuit 50 of FIG. 3.

In the FIG. 3 circuit 50, the oscillator element U1 is a CMOS inverter gate, 4093. This inverting gate is connected as an amplifier which becomes a self-excited oscillator circuit 52 when connected with the circuit elements shown in FIG. 3. This gate is selected to have a suitable gain factor at the oscillation frequency. In the preferred embodiment the gain is sufficient so that the output from the gate is essentially square wave of constant amplitude over the whole range of measurement of gas pressures. Other discrete and integrated circuits are available and could be used as the oscillator 52.

Referring again to FIG. 3, it is important that the connection from the crystal 10 to the circuit input has a high impedance to avoid a resistive load on the crystal 10. This condition is satisfied when the input is connected to the CMOS inverter gate U1. In the preferred embodiment 50, a reactive load is applied directly to the crystal 10 by virtue of capacitor C5 connected at the input to the gate. With a crystal frequency of 32.768 kilohertz, a value of 39 picofarads for C5 has been found to be appropriate. With the elements of circuit 50 the wave form of the circuit input is essentially a sine wave.

It is important that the indicating circuit 53 not place a load on the input of the oscillator circuit 50. Thus, the indicating circuit of FIG. 3 incldes an operational amplifier U2A configured as a unity gain follower transimpedance amplifier providing an appropriately high impedance input into the indicating circuit 53. The unity gain follower U2A is followed by a second operational amplifier U2B configured as a conventional active rectifier circuit. As shown, the circuit 50 yields a DC output which is a linear function of the amplitude of oscillation, which can be read on any suitable display device 56 calibrated to indicate pressure as the antilogarithm of the magnitude of the amplitude of oscillation. The indicator 56 may be a calibrated analog meter, for example. A bar graph display, or other suitable display device may also be used with satisfactory results. A microprocessor based digital display using conventional lookup table techniques may also be employed. Also, a calibration resistance may be connected in series with the crystal 10 during manufacturing of the sensor 24 in order to calibrate the response of the particular crystal 10 installed therein and eliminate any tolerances and variations otherwise encountered in mass production of the sensor 24.

Figure 4:
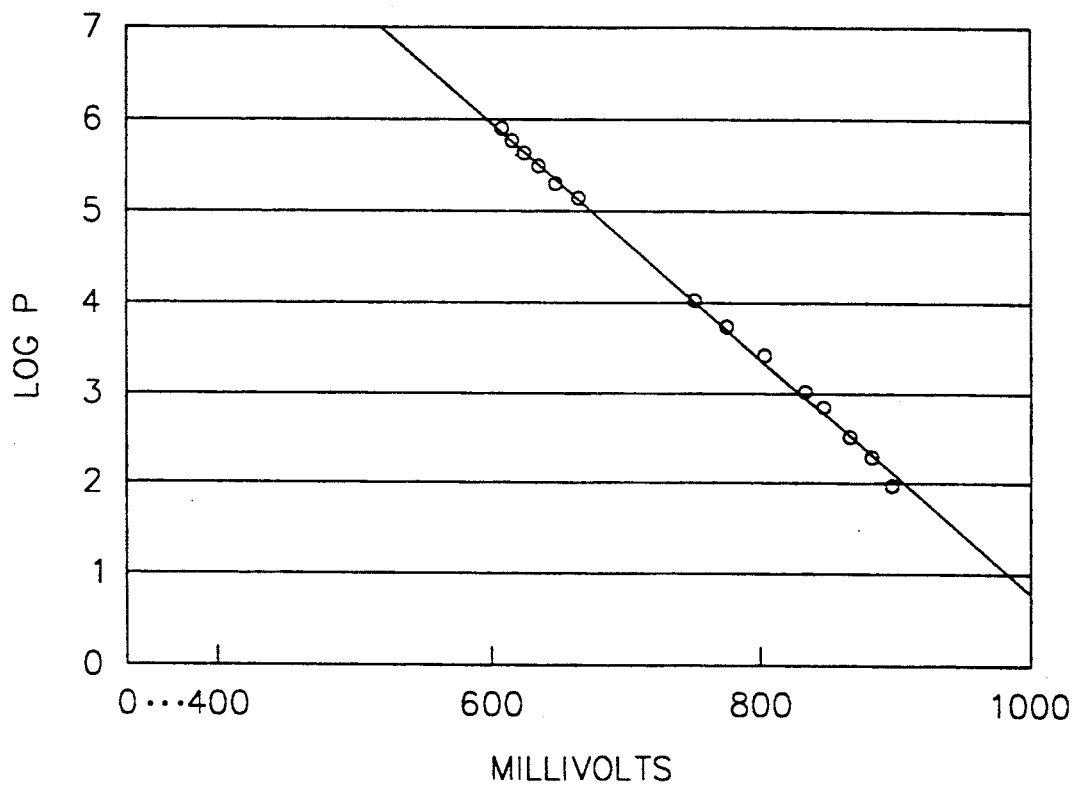
FIG. 4 is a graph of voltage versus pressure, illustrating operation of the FIG. 3 sensor instrument.

FIG. 4 is an exemplary plot of indicator signal amplitude (measured in millivolts) plotted along a linear scale abscissa axis versus vacuum pressure in microns of mercury plotted along a logarithmic scale ordinate axis, using air as the gaseous medium. The FIG. 4 plot extends from 1 bar (760,000 microns) to about 0.1 millibars (76 microns) but the range may be larger.

It is seen that the relationship on the semilog scale appears to be approximately a straight line over the whole range. This provides for a practical and useful scale for monitoring gas pressure changes. For example, a fixed fractional change of pressure results in the same amplitude change over the entire gas pressure range plotted in FIG. 4.

Figure 5:
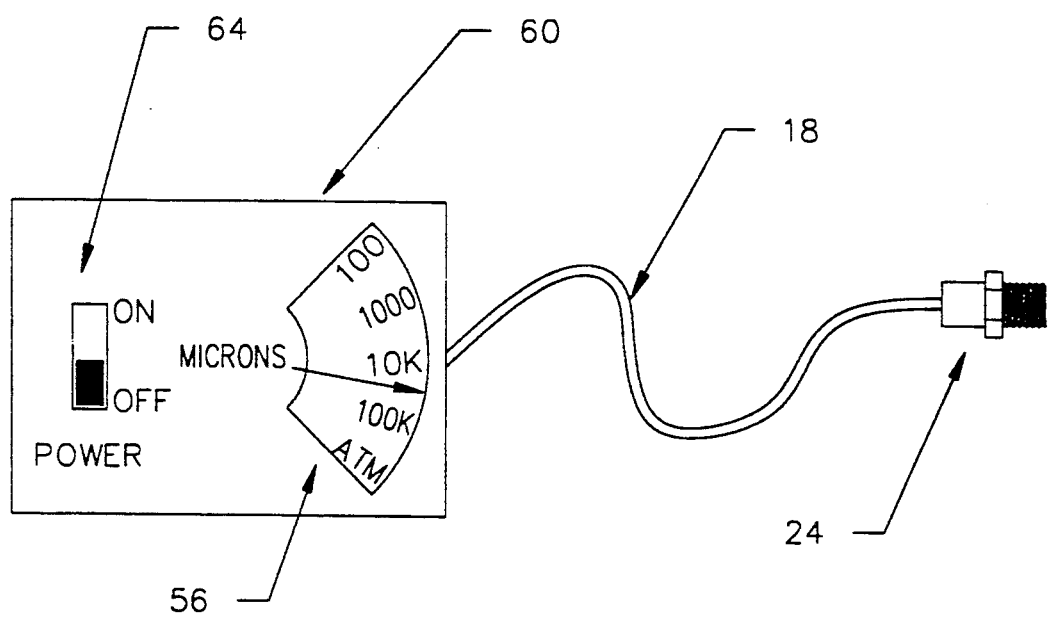
FIG. 5 is a view of an assembled sensor instrument embodying the FIG. 3 circuitry.

FIG. 5 illustrates a small, portable, hand held battery powered gas pressure gauge 60 containing the circuit 50 which includes battery 62 for powering the circuit 50. A cable includes leads to the sensor assembly 24 for connecting to the crystal leads 18 and 20. The cable may be any practical length, such as 5 feet, for example. A connector may be provided to enable connection of the cable to the gauge 60. The indicating voltmeter 56 is contained within the gauge 60, and an on-off switch 64 is also provided. A battery eliminator (not shown) may be provided, and if the battery 62 is rechargeable, the eliminator may be configured to charge the battery, when the gauge 60 is not in use. While FIG. 5 illustrates a standalone unit, it is apparent that the gas pressure sensor may be included as a functional component or monitoring circuit within a larger system. Monitoring gas pressures obtained by a vacuum pump is a particularly advantageous application.

To those skilled in the art to which the present invention pertains many widely differing embodiments will be suggested by the foregoing without departing from the spirit and scope of the present invention. The descriptions and disclosures herein are intended solely for purposes of illustration and should not be construed as limiting the scope of the present invention which is more particularly pointed out by the following claims.

What is claimed is:

1. A quartz crystal gas pressure sensor for sensing a range of pressures within a gaseous environment comprising:

quartz crystal means connected to manifest a continuous piezoelectric effect upon excitation by an alternating electric field and communicating with the gaseous environment, oscillator circuit means connected to the quartz crystal means for generating the alternating electric field and including means for generating an amplitude signal relating to amplitude of vibration of the quartz crystal means as a function of a said pressure within said gaseous environment, and indicator circuit means connected to said amplitude signal means for converting said amplitude signal into an indication of said pressure.

2. The quartz crystal gas pressure sensor set forth in claim 1 wherein the indicator circuit means provides said indication of said pressure as a logarithm proportional to said amplitude electrical signal over said range.

3. The quartz crystal gas pressure sensor set forth in claim 1 wherein the oscillator circuit means includes oscillation enhancing means for starting continuous piezoelectric response of the quartz crystal means over a range within said gaseous environment extending from 0.1 millibar to 1 bar.

4. The quartz crystal gas pressure sensor set forth in claim 1 wherein the amplitude signal generating means comprises feedback amplifier means having a high impedance input connected to said quartz crystal means, and having a low impedance output connected to said quartz crystal means.

5. The quartz crystal gas pressure sensor set forth in claim 1 wherein said indicator circuit means comprises a second transimpedance amplifier means having a high impedance input connection from said amplitude signal means for receiving the electrical signal and having a low impedance output.

6. The quartz crystal gas pressure sensor set forth in claim 5 wherein said indicator circuit means comprises rectifier means connected to said second transimpedance amplifier means, for converting the electrical signal into a DC voltage having a magnitude proportional to the amplitude of said signal.

7. The quartz crystal gas pressure sensor set forth in claim 6 wherein the function of said gas pressure being sensed is a logarithm which is proportional to said magnitude.

8. The quartz crystal gas pressure sensor set forth in claim 1 wherein the quartz crystal means comprises a miniature time base crystal originally contained in a hermetically sealed and evacuated housing and which has been modified by provision of a small opening in the housing for communicating with the gaseous environment.

9. The quartz crystal gas pressure sensor set forth in claim 8 wherein the miniature time base crystal and housing are contained within a fixture communicating directly with the gaseous environment, and further comprising porous filter media means in the fixture for protecting the time base crystal against intrusion by contaminants from the gaseous environment.

10. The quartz crystal gas pressure sensor set forth in claim 9 wherein the fixture is a threaded fixture for enabling the fixture to be threaded onto a fitting directly communicating with the gaseous environment.

11. A method for sensing gas pressure in a gaseous environment comprising the steps of:

causing a quartz crystal to oscillate in direct physical communication with the gaseous environment in response to an exciting electric field and generate a crystal signal, sensing the amplitude of vibration of the quartz crystal from the magnitude of the electrical signal generated by the crystal, and displaying the magnitude of the electrical signal as a measurement of the pressure.

12. The method set forth in claim 11 wherein the pressure within the gaseous environment extends over a predetermined range.

13. The method set forth in claim 12 wherein the predetermined range is 0.1 millibar to 1 bar.

14. The method set forth in claim 11 wherein the magnitude of the crystal signal is a function which is approximately linear as the negative logarithm of the pressure.

* * * * *